(12) United States Patent
Koshoffer

(10) Patent No.: US 6,336,319 B1
(45) Date of Patent: Jan. 8, 2002

(54) FLUIDIC NOZZLE CONTROL SYSTEM

(75) Inventor: John Michael Koshoffer, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/579,818

(22) Filed: May 26, 2000

(51) Int. Cl.$^7$ ................................................ B63H 11/00
(52) U.S. Cl. ............................. 60/204; 60/237; 60/271; 239/265.19; 239/265.17; 239/265.23
(58) Field of Search .............. 60/237, 271; 239/265.17, 239/265.19, 265.23

(56) References Cited

U.S. PATENT DOCUMENTS

| | | | |
|---|---|---|---|
| 2,699,906 A | 1/1955 | Lee et al. ...................... | 244/53 |
| 2,948,148 A | 8/1960 | D'Anfreville et al. ........ | 73/147 |
| 3,000,178 A | 9/1961 | Logerot ....................... | 60/35.6 |
| 3,288,373 A | 11/1966 | Pike ...................... | 239/265.23 |
| 3,289,410 A | 12/1966 | Balwanz ...................... | 60/205 |
| 3,325,103 A | 6/1967 | Abbott .................. | 239/265.17 |
| 3,370,794 A | 2/1968 | Drewry et al. ......... | 239/265.17 |
| 3,420,060 A * | 1/1969 | Ostroff et al. ................ | 60/264 |
| 4,077,572 A * | 3/1978 | Fitzgerald .............. | 239/265.23 |
| 5,664,415 A | 9/1997 | Terrier .......................... | 60/204 |
| 6,112,513 A * | 9/2000 | Catt et al. ..................... | 60/204 |

FOREIGN PATENT DOCUMENTS

CA          618830          8/1961

OTHER PUBLICATIONS

Richard D. Guhse, "An Experimental Investigation of Thrust Vector Control by Secondary Injection," NASA CR–297, pp. 21–22; 27.

United Aircraft Corporation Research Laboratories, B910063–9, "A Theoretical and Experimental Study of Thrust Vector Control by Secondary Gas Injection," dated Apr. 19, 1963.

Irwin E. Treager, "Aircraft Gas Turbine Engine Technology," Second Edition, 1979. pp. 152–155; pp. 390–391; pp. 410; 412.

AIAA 95–2605 Fluidic Control of Nozzle Flow—Some Performance Measurements; Federspiel, J., et al., 31st AIAA/ASME/SAE/ASEE Joint Propulsion Conference and Exhibit; Jul. 10–12; San Diego, CA.*

AIAA 95–2603, "Conceptual Developement of Fixed–Geometry Nozzles Using FluidicInjection for Throat Area Control," D.N. Miller et al., 1995.

AIAA 95–2604, "A Static Investigation of Fixed–Geometry Nozzles Using Fluidic Injection for Throat Area Control," J.A. Catt et al., 1995.

AIAA 95–2605, "Fluidic Control of Nozzle Flow—Some Performance Measurements," J. Federspiel et al., 1995.

* cited by examiner

Primary Examiner—Charles G. Freay
Assistant Examiner—E Hayes
(74) Attorney, Agent, or Firm—Andrew C. Hess; Rodney M. Young

(57) ABSTRACT

A control system for selectively adjusting effective flow areas of an aircraft engine exhaust nozzle to change operational characteristics of the nozzle. The control system includes a chamber having a hollow interior, a plurality of outlet passages extending from the hollow interior of the chamber to sites within the exhaust nozzle, and an adjustable inlet extending from a pressurized air source to the hollow interior of the chamber for delivering a jet of pressurized air to the chamber. The inlet is adjustable to direct pressurized air to selected one or more outlet passages for the delivery of air via the one or more outlets to corresponding one or more sites within the exhaust nozzle, thereby to change the operational characteristics of the nozzle.

17 Claims, 3 Drawing Sheets

FLUIDIC NOZZLE CONTROL SYSTEM

BACKGROUND OF THE INVENTION

The present invention relates generally to exhaust systems for aircraft gas turbine engines, and in particular to a control system for selectively adjusting effective flow areas of an aircraft engine exhaust nozzle to change operational characteristics of the nozzle.

High performance advanced aircraft must operate over a wide range of flight conditions while maintaining good fuel efficiency and high maneuverability. Typically, these aircraft include an exhaust nozzle for each engine that permits variation in exhaust gas flow area. The nozzle has a convergent duct, a plane of minimum flow area known as a throat, and a divergent duct ending at a nozzle exit. The throat and exit may be varied in size to provide for efficient engine operation at all engine power settings, flight speeds, and altitudes. Some variable-area nozzles provide for controllable deflection of the direction of exhaust gas flow, known as thrust vectoring, to enhance aircraft controllability. Thrust vectoring offers the potential of substantial performance benefits and can permit conventional aerodynamic controls, such as tail surfaces, to be reduced in size or eliminated altogether.

Unfortunately, a variable-area nozzle requires a complex mechanism that is heavy and costly. It has several moveable flaps with associated linkages and hydraulic actuators. The mechanism adds weight and structural complexity, and requires regular maintenance. Even greater structural weight penalties are incurred to include the variable-area mechanism in nozzles having unconventional shapes, such as wide aspect ratio, elliptical, or diamond. Further, each moveable flap of the variable-area nozzle has edges and surface gaps between adjacent structure that can make the nozzle more visible on radar, which is undesirable for military aircraft.

As an alternative to mechanized variation of the physical boundaries of the throat and exit, the flow areas can be varied fluidically, thereby providing several advantages. Effective flow areas in a fluidic nozzle are varied by injecting pressurized air at selected locations along a perimeter of the throat or the divergent duct to constrict area available for exhaust gas, aerodynamically blocking a portion of the flow area. As a result, the nozzle can be mechanically fixed in geometry, without need for any moveable flaps. Nozzle weight is low because there are no actuators or moving parts, and the structure is more efficient. The nozzle may have any desired shape and is therefore more easily integrated into a structural design of an aircraft. Surfaces of the nozzle are smooth, without any gaps, permitting improved radar signature.

A drawback to the fluidic nozzle has been that a complex system of pipes, manifolds, and valves was needed to distribute pressurized air to desired locations. For instance, one type of fluidic nozzle requires three manifolds and nine valves, along with interconnecting pipes to deliver compressor discharge air to various locations. These parts add weight and cost and degrade reliability. Further, the parts must be dispersed about the nozzle and cannot be packaged into one location that is designed for reduced vulnerability to weapons, thus degrading survivability.

SUMMARY OF THE INVENTION

In general, a control system of the present invention selectively adjusts effective flow areas of an aircraft engine exhaust nozzle to change operational characteristics of the nozzle. The control system comprises a chamber having a hollow interior, a plurality of outlet passages extending from the hollow interior of the chamber to sites within the exhaust nozzle, and an adjustable inlet. The inlet extends from a pressurized air source to the hollow interior of the chamber for delivering a jet of pressurized air to the chamber. The inlet is adjustable to direct pressurized air to selected one or more outlet passages of the plurality of outlet passages for the delivery of air via the one or more outlets to corresponding one or more sites within the exhaust nozzle, thereby to change the operational characteristics of the nozzle.

In another aspect, a gas turbine engine of the present invention for providing propulsion to an aircraft has a fluidic control system. The engine comprises a nozzle having a duct for exhausting gas from the engine, the duct having at least one variable flow area for controlling operational characteristics of the engine. A source of pressurized air and a fluidic control system are included for selectively adjusting at least one flow area of the duct. The control system comprises a chamber having a hollow interior, a plurality of outlet passages extending from the hollow interior of the chamber to sites within the nozzle, and an adjustable inlet extending from the pressurized air source to the hollow interior of the chamber for delivering a jet of pressurized air to the chamber. The inlet is adjustable to direct pressurized air to selected one or more outlet passages of the plurality of outlet passages for the delivery of air via the one or more outlets to corresponding one or more sites within the nozzle thereby to change the operational characteristics of the engine.

In yet another aspect, a method of the present invention of selectively adjusting effective flow areas of an aircraft engine exhaust nozzle changes operational characteristics of the nozzle. The method comprises the steps of supplying pressurized air to a chamber having a hollow interior and a plurality of outlet passages extending from the hollow interior of the chamber to sites within the exhaust nozzle. At least a portion of the pressurized air is selectively directed toward at least one outlet passage of the plurality of outlet passages for delivery of the portion of air to a corresponding site within the exhaust nozzle to change the operational characteristics of the nozzle.

In still another aspect, a method of the present invention controls an aircraft engine exhaust nozzle of the type having fluidic injection capability whereby a first flow of pressurized gas is delivered to the nozzle and injected into an exhaust stream for fluidically varying operational characteristics of the nozzle. The method comprises the step of selectively controlling the injection of the first flow into the exhaust stream using a control system that is fluidic.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figures 1, 2:
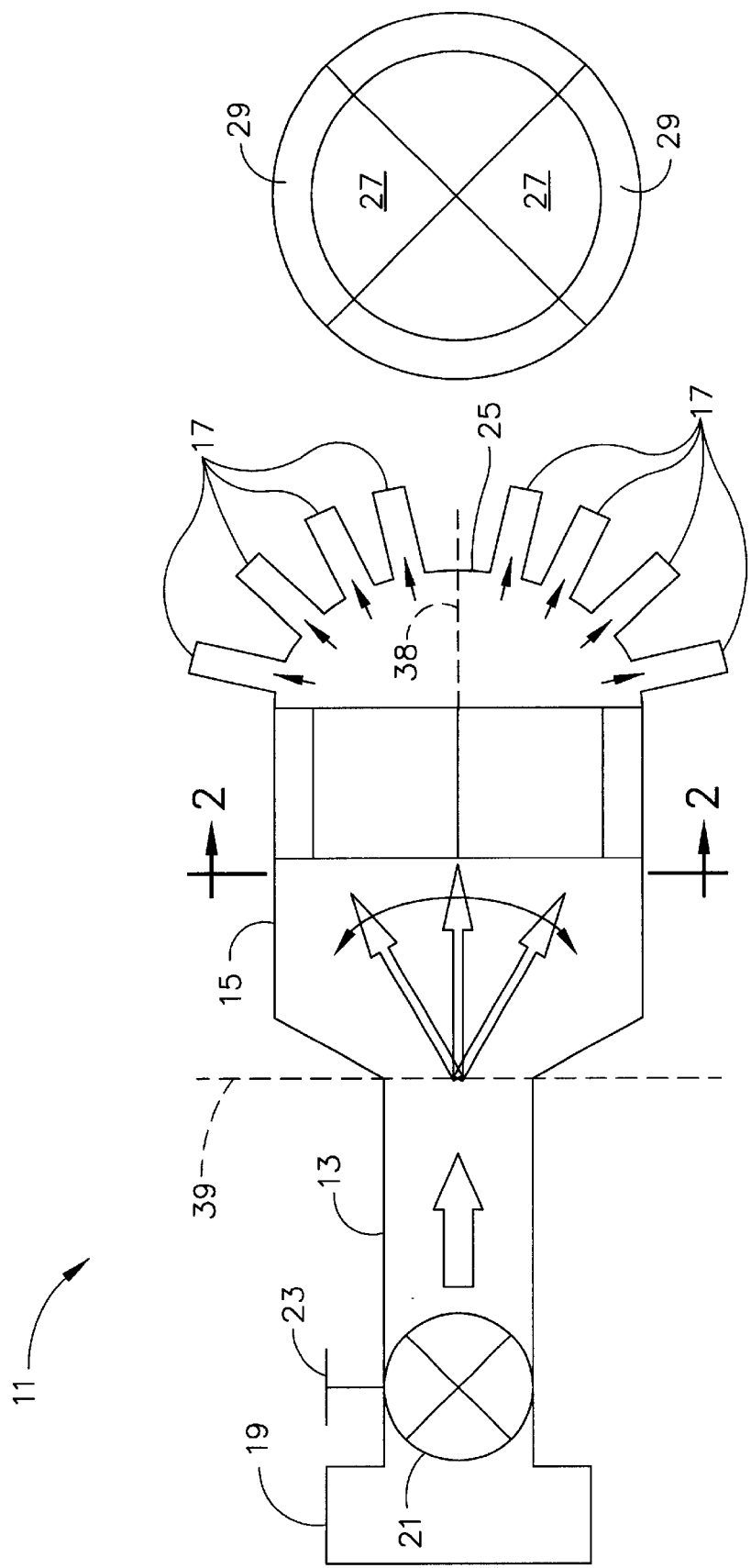
FIG. 1 is a schematic elevation of a control system according to the present invention.
FIG. 2 is a section along line 2—2 of FIG. 1.
Figure 3:
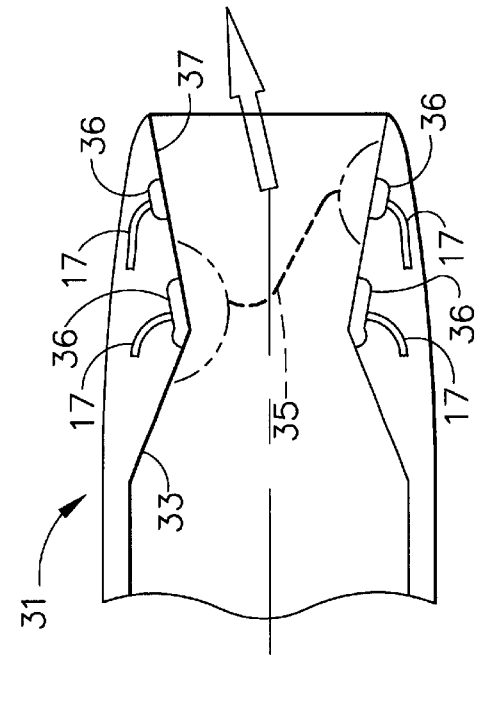
FIG. 3 is a schematic elevation of a fluidic exhaust nozzle at a dry power, nonvectored configuration.
Figure 4:
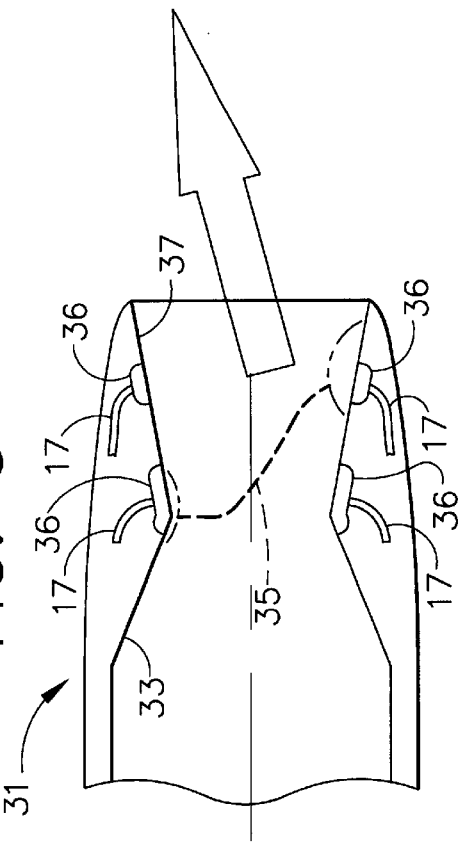
FIG. 4 is a schematic elevation of the nozzle at a reheat, nonvectored configuration.

Referring now to the drawings and in particular to FIG. 1, a control system for selectively adjusting effective flow areas of an aircraft gas turbine engine exhaust nozzle to change operational characteristics of the nozzle is indicated generally at 11. The control system 11 includes an adjustable inlet 13, a chamber 15 having a hollow interior, and a plurality of outlet passages 17. A flow of pressurized air passes sequentially from the inlet 13 into the chamber 15, and then to one or more outlet passages 17.

The inlet 13 comprises a passage which provides a flow of gas, such as air, to the control system from a source 19 of pressurized air. Preferably, the source 19 is the gas turbine engine, or a suitable air outlet on the engine such as a compressor bleed discharge port (not shown). Compressor discharge air has passed through at least a portion of the engine's compressor, elevating the pressure sufficiently to enable propelling the air to any location in the exhaust nozzle with a positive pressure gradient. However, any suitable source or sources of pressurized air can be used, such as a mid-compressor stage bleed or off-take, a fan discharge port of the engine, inlet bypass duct, or independent air circuit, without departing from the scope of this invention.

The inlet 13 preferably includes a control valve 21 for selectively varying a rate of flow through the inlet. The valve 21 can be selectively adjusted by a suitable control system, shown schematically by a T-handle 23 in FIG. 1. The selected rate of flow can range from zero to a maximum flow limited by a size of the inlet and the air pressure. The valve 21 can be located anywhere along the inlet 13 between the source 19 of air and the chamber 15. However, an inlet that has no control valve is included within the scope of this invention.

The chamber 15 is a plenum having a cross-sectional size which is larger than the inlet 13, and substantially oversized for the airflow provided from the inlet. Accordingly, the airflow does not expand sufficiently to fill the chamber 15. Rather, the air separates from peripheral walls of the chamber as it flows into and through the chamber. Thus, the airflow forms a free jet of air as it flows into the chamber 15. The jet may be directed or steered, as discussed below, toward one or more outlet passages 17 on a downstream end 25 of the chamber. Accordingly, the outlet passages 17 comprise targets for the jet. The jet can be steered along one side of the chamber 15 or may be steered toward a more central location. The chamber 15 may have a cylindrical shape, as shown in the preferred embodiment of FIGS. 1 and 2, or another suitable shape without departing from the scope of this invention.

The outlet passages 17 are disposed about the downstream end 25 of the chamber 15 to permit the jet of air to be steered toward one or more outlet passages. As seen in FIG. 1, the preferred embodiment has eight outlet passages 17. The passages are shaped, as seen in FIG. 2, to form adjoining sectors 27 of a circle and sectors 29 of an annulus generally covering the downstream end 25 of the chamber. The downstream end 25 may be spherical, concave, convex, flat, or other suitable shapes. There may be any number of outlet passages 17, shapes, arrangements, and locations of outlet passages about the chamber 15, without departing from the scope of this invention.

Referring now to FIGS. 3–6, a fluidically controlled exhaust nozzle is indicated generally at 31. The nozzle 31 may be of any suitable cross-sectional shape, such as circular, rectangular, elliptical, or diamond. The nozzle 31 includes a convergent duct 33, a minimum area section or throat 35, and a divergent duct 37.

Each outlet passage 17 is connected to a site or a region along an inner surface of the exhaust nozzle 31 to provide fluid communication between the chamber 15 and the nozzle. Air passing through the chamber 15 and into one of the outlet passages 17 is conveyed to the corresponding site on the exhaust nozzle 31. The sites may include any region of the exhaust nozzle where air is needed. For example, eight sites of the preferred embodiment include the upper, lower, left, and right sides of the throat 35 and the upper, lower, left, and right sides of the divergent duct 35 at a location about 80% of the distance from the throat to the exit. The air may be conveyed to other site locations and/or a different number of sites without departing from the scope of this invention.

Each outlet passage 17 has an outflow end 36 (FIGS. 3–6) having a suitable flow dispenser, such as a flow guide, exit plate, or distribution manifold. The outflow end 36 dispenses the air across the site as desired for injection through the nozzle surface and into the main exhaust flow. The outflow end is formed so it does not interfere with cooling air delivered along a nozzle duct liner (not shown), so nozzle cooling is substantially unaffected.

Without fluidic injection, the throat 35 is defined by the physical limits of the duct wall at the throat. As known by those skilled in the art, fluidic injection reduces effective flow area by blocking a portion of the physical flow area with injected air. The area of throat 35 may be reduced to the reheat, nonvectored configuration of FIG. 4 by injecting air that is symmetrically divided between the upper and lower sites. To accomplish this configuration, the air jet is steered parallel to a central axis 38 in the chamber 15. The jet is targeted to a center of the downstream end 25 of the chamber 15 as shown in FIG. 2, where it will be divided in approximately equal portions among the adjoining sectors 27 of the circle. Those outlet sectors 27 lead to sites generally surrounding the throat 35 of the nozzle. Throat area can be decreased further to the dry power nonvectored configuration of FIG. 3 by injecting a greater quantity of air. To accomplish this configuration, the jet continues to be steered parallel to the central axis 38 while the valve 21 in the inlet 13 is adjusted to provide an increased amount of pressurized air, thereby decreasing the effective size of the throat 35.

Figure 5:
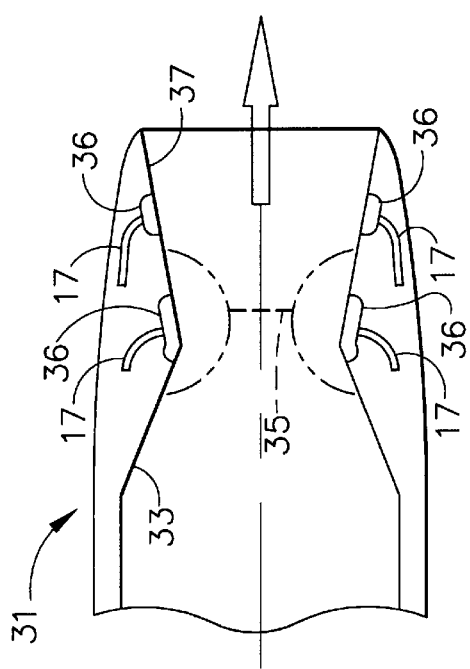
FIG. 5 is a schematic elevation of the nozzle at a dry power, thrust vectored configuration.
Figure 6:
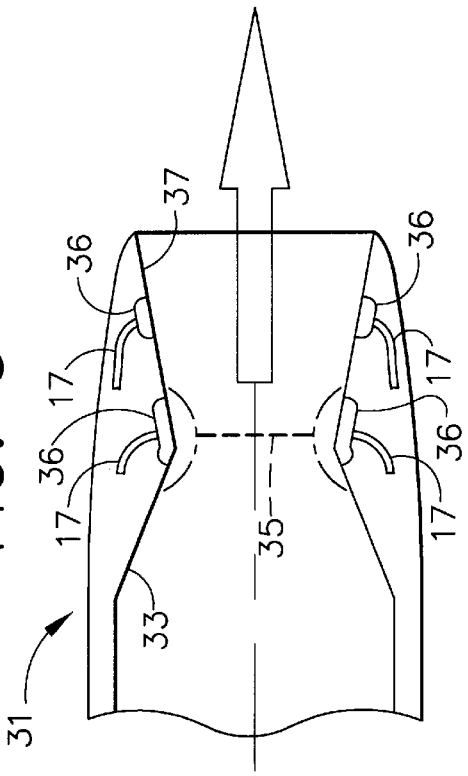
FIG. 6 is a schematic elevation of the nozzle at a reheat, thrust vectored configuration.

Thrust vectoring may be achieved by injecting air in a non-symmetrical pattern, as shown in the vectored configurations of FIGS. 5 and 6. Air is injected at a site on the lower surface of the divergent duct 37 at a position farther downstream than on the upper surface. Injected air deflects the main exhaust stream and the throat plane becomes skewed, tending to turn the exhaust stream and generating a corresponding angle of thrust force. The magnitude of the thrust force is not substantially reduced by this method of vectoring. To accomplish the FIG. 6 configuration, the jet is steered upwardly in the chamber where it will be divided among the upper sectors 27, 29, as shown on FIG. 2. The upper sector 29 of the annulus leads to a site on the divergent duct 37 along the lower side of the nozzle, while the upper sector 27 of the circle leads to a site at the throat 35 along the upper side. The FIG. 5 configuration is accomplished with the same steering trajectory as for FIG. 6, but the valve 21 is adjusted to provide an increased amount of pressurized air to decrease the throat 35 to an effective size appropriate for dry power operation.

Although vertical or pitch plane thrust vectoring is shown on FIGS. 5 and 6, horizontal or yaw plane thrust vectoring may be readily achieved by delivering air to an appropriate site or combination of sites on lateral sides of the nozzle 31. Similarly, combination pitch and yaw plane vectoring is readily accomplished, as well as combination throat area variation and thrust vectoring.

As mentioned above, the air flow in the chamber 15 may be steered or directed towards one or more of the outlet passages 17. The steering preferably occurs generally at a control plane 39 (FIG. 1) located where the flow leaves the inlet 13 and enters the chamber 15, although other locations in the chamber do not depart from the scope of this invention. After steering is accomplished, the jet will generally continue along a constant trajectory throughout the chamber 15. For instance, if air is needed in the upper annulus sector 29, air flow entering the chamber 15 is steered toward that sector to deliver air to that outlet passage and corresponding site of the nozzle 31.

Figure 7:
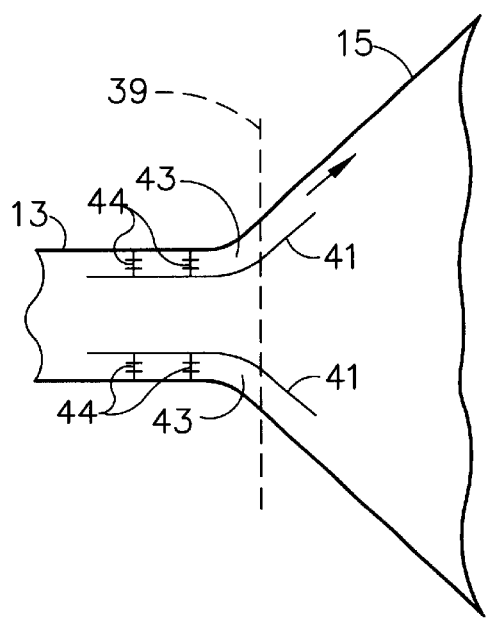
FIG. 7 is a schematic elevation of a channel for injecting steering air into the control system to steer air flow through the system.

Preferably, steering is accomplished by a fluidic method, free from mechanical flow deflectors. In the preferred embodiment shown in FIG. 7, several tabs 41 or plates are mounted about a periphery of the inlet 13 and entrance to chamber 15, generally at the control plane 39. The tabs 41 are generally parallel to the walls, forming a channel 43 or series of channels between each tab and the wall. Pressurized air, known as steering air, is introduced in the channel 43 by conventional flow injectors 44 so it flows from the channel at a high velocity. The steering air can be introduced along any selected circumferential portion of the periphery of the inlet. The steering air preferably originates from the compressor discharge of the engine 19, although other sources are envisioned. The volume of steering air introduced into the channel 43 is significantly less than the volume flowing through the inlet 13. Although a system of ducts and actuated valves (not shown) are required to distribute the steering air to selected injectors 44 about the circumference, the weight and complexity of this system are small because of the small amount of steering air needed.

Flow through the inlet 13 is steered by injecting steering air at selected circumferential locations about the periphery of the inlet. The inlet flow is turned partially by a mechanism known to those skilled in the art as Coanda Effect turning. The Coanda Effect is a natural tendency of fluids to adhere to and be deflected by a surface nearly tangential to the flow path. The steering air from the channel 43 flows generally parallel to a wall of the chamber 15 at a high velocity, producing a low static pressure which draws the jet traveling out of the inlet 13 toward the wall of the chamber. Steering air mixes with the jet and turns inlet flow parallel to the direction of motion of the steering flow. For example, in order to steer the jet upwardly, steering air is introduced into a channel 43 along an upper portion of the circumference of the inlet 13. Alternatively, to steer the jet downwardly, steering air is introduced into a channel 43 along a lower portion of the circumference of the inlet 13. Thus, the jet can be directed to adhere to one wall of the chamber 15, such as an extreme upper or left side surface. It is expected that by proper distribution of the steering air among the channels 43 about the circumference of the inlet 13, the jet can be selectively directed to any angle between the walls, anywhere within the interior of the chamber 15, with reasonable degree of accuracy.

Figure 8:
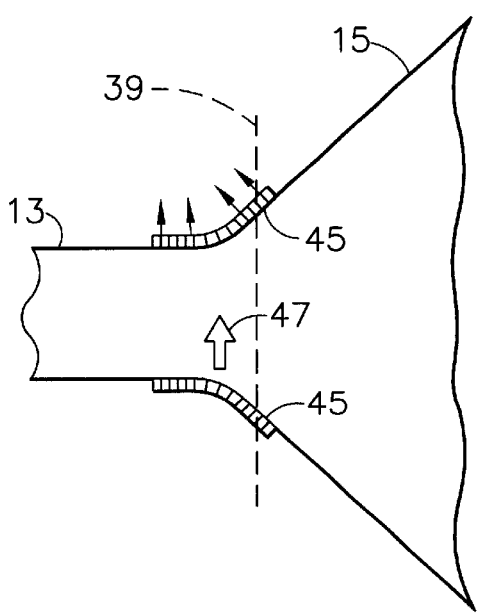
FIG. 8 is a schematic elevation of a second embodiment of a control system for steering flow through the system.

A second embodiment of the present invention, shown in FIG. 8, also steers the flow fluidically. It includes a porous surface 45 or porous wall about the periphery of the inlet 13 and entrance to the chamber 15, generally at the control plane 39. A vacuum or suction is applied through the porous surface 45 to draw the inlet air flow generally laterally to a selected trajectory. If necessary to improve the controllability of steering, a stream of steering air may be injected, indicated by arrow 47, to further push the flow. The injected stream 47 is generally diametrically opposite to the applied suction and generally perpendicular to the inlet air flow. A combination of suction and opposite injection may be applied, or either suction or injection may be applied separately. It is expected that application of suction and/or opposed injection at suitable strengths and locations can steer the jet to any angle within the interior of the chamber 15 with a reasonable degree of accuracy.

Figure 9:
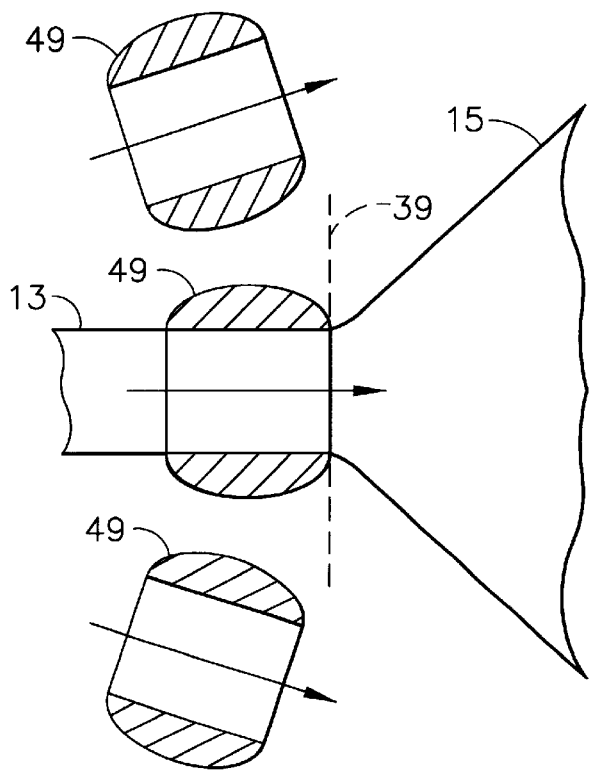
FIG. 9 is a schematic elevation of a third embodiment of a control system for steering flow through the system.

A third embodiment for steering the flow, shown in FIG. 9, uses a pivotable nozzle 49 which does not require any steering air. The steerable nozzle 49 is positioned along the inlet 13 generally at the entrance to the chamber 15. The steerable nozzle 49 is gimballed to direct the jet along a desired trajectory in the chamber 15. A conventional actuation mechanism may be employed for moving the nozzle 49. Other mechanical embodiments for steering the flow, such as turning vanes and flaps, are also envisioned as being within the scope of this invention.

In operation, the control system 11 permits selective distribution of pressurized air along the inner surface of the exhaust nozzle 31. As the aircraft flight conditions vary and the engine is operated at several power settings, the nozzle 31 must achieve various throat areas. The control valve 21 in the inlet 13 is adjusted to vary the amount of flow that is fluidically injected to block the physical flow area. The jet is steered in the chamber 15 to outlet passages 17 leading to sites at the throat 35 of the nozzle, with the flow being symmetrically distributed about the throat. When thrust vectoring is needed in a maneuver or to augment control of the aircraft, the flow is steered to a new combination of outlet passages 17 within the chamber. Those outlet passages distribute the flow to sites that are not symmetric about the nozzle 31, thereby changing the direction of the exhaust stream. The jet in the chamber 15 may be steered to go entirely to one site in the nozzle 31, or it may be split among two or more sites in desired proportions. Steering is accomplished by one of several methods, preferably by changing the distribution of the small quantity of steering air.

Importantly, the fluidic control embodiments of the present invention achieve control of a fluidic exhaust nozzle using a fluidic device. The system functions like a double flow amplifier. The small quantity of steering air flow controls a greater quantity of inlet air flow, which in turn controls an even greater quantity of the main exhaust flow.

Thus, the invention provides a control system for selectively adjusting effective flow areas of an aircraft engine exhaust nozzle to change operational characteristics of the nozzle. The adjustable inlet 13 and chamber 15 result in lower weight, fewer parts, and reduced cost relative to fluidic nozzles of the prior art. The parts of the present invention, most of which are at the chamber 15, are readily packaged into one location in the aircraft to facilitate reduced vulnerability.

When introducing elements of the present invention or the preferred embodiment(s) thereof, the articles "a", "an", "the" and "said" are intended to mean that there are one or more of the elements. The terms "comprising", "including"

and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A control system for selectively adjusting effective flow areas of an aircraft engine exhaust nozzle to change operational characteristics of the nozzle, the control system comprising:
   a chamber having a hollow interior, an upstream end, and a downstream end;
   a plurality of outlet passages at said downstream end and extending from the hollow interior of the chamber to sites within the exhaust nozzle; and
   an inlet extending from a pressurized air source to the hollow interior of the chamber at said upstream end for delivering a jet of pressurized air to the chamber, wherein the inlet is adjustable to steer said jet of pressurized air to selected one or more outlet passages of said plurality of outlet passages at said downstream end of the chamber for the delivery of air via said one or more outlets to corresponding one or more sites within the exhaust nozzle thereby to change the operational characteristics of the nozzle.

2. A control system as set forth in claim 1 wherein the inlet is fluidically controlled.

3. A control system as set forth in claim 2 wherein the inlet comprises at least one fluid injection channel for injecting pressurized steering air to interact with air passing through the inlet and to fluidically direct air entering the chamber.

4. A control system as set forth in claim 3 wherein said channel is located generally at a periphery of said inlet.

5. A control system as set forth in claim 2 wherein the inlet comprises at least one porous surface at a periphery of said inlet for connection to a source of vacuum to create a suction along the surface to direct air entering the chamber.

6. A control system as set forth in claim 1 wherein the inlet comprises a pivotable nozzle.

7. A control system as set forth in claim 1 wherein the inlet is adjustable to vary the number of outlet passages that receive pressurized air.

8. A control system as set forth in claim 1 wherein the inlet is adjustable to vary a rate of flow through the inlet.

9. A control system as set forth in claim 8 further comprising a valve in the inlet for selectively controlling the rate of flow.

10. A control system as set forth in claim 1 wherein the inlet is adjustable to vary a direction of flow through the nozzle thereby to vary an angular orientation of thrust force produced by the nozzle.

11. A control system as set forth in claim 1 wherein said chamber is larger than the inlet so that said pressurized air delivered from the inlet does not expand sufficiently to fill the chamber as it flows through the chamber, said air separating from at least one peripheral wall of said chamber.

12. A gas turbine engine for providing propulsion to an aircraft, the engine having a fluidic control system, the engine comprising:
   a nozzle having a duct for exhausting gas from the engine, said duct having at least one variable flow area for controlling operational characteristics of the engine;
   a source of pressurized air; and
   a fluidic control system for selectively adjusting said at least one flow area of the duct, the control system comprising:
      a chamber having a hollow interior;
      a plurality of outlet passages extending from the hollow interior of said chamber to sites within the nozzle; and
      an inlet extending from said pressurized air source to the hollow interior of said chamber for delivering a jet of pressurized air to said chamber, wherein the inlet is adjustable to direct pressurized air to selected one or more outlet passages of said plurality of outlet passages for the delivery of air via said one or more outlets to corresponding one or more sites within the nozzle thereby to change the operational characteristics of the engine.

13. A method of selectively adjusting effective flow areas of an aircraft engine exhaust nozzle to change operational characteristics of the nozzle, the method comprising the steps of:
   supplying pressurized air to a chamber having a hollow interior and a plurality of outlet passages extending from the hollow interior of the chamber to sites within the exhaust nozzle; and
   fluidically steering at least a portion of the pressurized air toward at least one outlet passage of said plurality of outlet passages to deliver said portion of air to a corresponding site within the exhaust nozzle and thereby change the operational characteristics of the nozzle.

14. A method as set forth in claim 13 wherein the step of fluidically steering comprises injecting steering air into the chamber to interact with said pressurized air to selectively change a direction of motion of said pressurized air.

15. A method as set forth in claim 14 wherein said steering air is injected at a peripheral location about said pressurized air.

16. A method as set forth in claim 13 wherein the step of fluidically steering comprises applying a suction about a periphery of said pressurized air.

17. A method of controlling an aircraft engine exhaust nozzle of the type having fluidic injection capability whereby a first flow of pressurized gas is delivered to the nozzle and injected into an exhaust stream for fluidically varying operational characteristics of the nozzle, the method comprising the step of selectively controlling said injection of the first flow into the exhaust stream using a fluidic control system by injecting a second flow of pressurized gas into said first flow to adjust a distribution of the first flow delivered to the nozzle, so the exhaust stream is controlled fluidically through injection of the first flow and the first flow is controlled fluidically through injection of the second flow.

* * * * *